United States Patent [19]

Maska et al.

[11] Patent Number: 4,916,181
[45] Date of Patent: Apr. 10, 1990

[54] WATER-BORNE ACRYLIC/POLYESTER RESIN

[75] Inventors: Rudolf Maska, Pittsburgh; William A. Essary, Freeport, both of Pa.

[73] Assignee: PPG Industries, Inc., Pittsburgh, Pa.

[21] Appl. No.: 102,209

[22] Filed: Sep. 29, 1987

[51] Int. Cl.$^4$ .............................................. C08L 67/06
[52] U.S. Cl. .................................... 524/457; 524/487; 525/378; 525/379
[58] Field of Search ......................... 524/457, 487, 461

[56] References Cited

U.S. PATENT DOCUMENTS

| | | | |
|---|---|---|---|
| 3,338,985 | 8/1967 | Magat et al. | 260/830 |
| 3,933,939 | 1/1976 | Isozaki et al. | 260/872 |
| 3,989,767 | 11/1976 | Homma et al. | 260/834 |
| 4,033,920 | 7/1977 | Isozaki et al. | 260/29.6 H |
| 4,069,274 | 1/1978 | Shibata et al. | 260/836 |
| 4,089,910 | 5/1978 | Shibata et al. | 260/836 |
| 4,100,127 | 6/1978 | Fukusaki et al. | 260/29.6 |
| 4,113,702 | 9/1978 | Psencik | 528/75 |
| 4,124,551 | 11/1978 | Mathai et al. | 260/23 AR |
| 4,273,888 | 6/1981 | Graetz | 525/31 |
| 4,405,747 | 9/1983 | Ehmann et al. | 524/487 |
| 4,504,609 | 3/1985 | Kuwagima et al. | 524/457 |
| 4,517,322 | 5/1985 | Birkmeyer et al. | 523/501 |
| 4,518,724 | 5/1985 | Kuwagima et al. | 524/457 |
| 4,690,980 | 9/1987 | Singer et al. | 525/286 |

FOREIGN PATENT DOCUMENTS 49-47916 12/1974 Japan .

*Primary Examiner*—Joseph L. Schofer
*Assistant Examiner*—T. McDonald, Jr.
*Attorney, Agent, or Firm*—Thomas M. Breininger

[57] ABSTRACT

Disclosed is an aqueous composition of low viscosity and low volatile organic solvent content of a water-borne resin. The water-borne resin comprises: (I) from 10 to 50 percent by weight of a polyester polymer, and (II) from 90 to 50 percent by weight of a solution polymerized acrylic copolymer. The solution polymerized acrylic copolymer is derived from a mixture of monomers comprising an ethylenically unsaturated carboxylic acid monomer. The water-borne resin is at least partially neutralized by a base and, prior to neutralization, has an acid value based on resin solids of from 10 to 200.

Also disclosed is a method for preparing the aqueous composition which comprises: (A) addition polymerizing in solution a first monomer composition containing from 1 percent to 15 percent by weight of an epoxy-functional vinyl monomer and from 99 percent to 85 percent by weight of at least one other copolymerizable vinyl monomer in the presence of a polyester polymer having an acid value on solids of from 10 to 85 and a weight average molecular weight of from 500 to 2,000 until the epoxy functionality of the epoxy-functional vinyl monomer has been essentially completely reacted, to form a first product (1), and thereafter, (B) addition polymerizing in the aforesaid first product (1), a second monomer composition containing from 3 to 50 percent by weight, based on the total weight of vinyl monomers from parts (A) and (B), of an ethylenically unsaturated carboxylic acid and at least one other copolymerizable vinyl monomer different from the epoxy-functional vinyl monomer, to form a second product (2), and thereafter, (C) dispersing the aforesaid product (2) in water utilizing a base.

8 Claims, No Drawings

WATER-BORNE ACRYLIC/POLYESTER RESIN

BACKGROUND OF THE INVENTION

This invention is directed to an aqueous composition of a water-borne resin comprising a polyester polymer and a solution polymerized acrylic copolymer which has been at least partially neutralized by a base.

Increasingly stringent policies and regulations for the protection of the enviornment have increased the need for polymeric resinous compositions having very low contents of volatile organic components, i.e., having very low VOCs ("volatile organic contents"). Polymeric resinous compositions are utilized for example in coating compositions of various types. Since the polymeric resinous material, typically employed as binder in such compositions, often makes up a substantial part of the composition as a whole, the volatile organic solvent content of the resin utilized as binder is quite important with respect to achieving a low VOC for the composition as a whole.

However, it has been difficult to achieve low VOC in water-borne systems employing solution polymerized acrylic resins, for example in systems employing a combination of acrylic and polyester resins. The removal of organic solvents from resinous compositions containing solution polymerized acrylic copolymers in attempting to achieve low VOC generally is accompanied by the significant drawback of causing the viscosity of the resin compositions to increase to an undesirable extent and may even result in gelation.

The present invention is directed to contributing to the solution of the aforesaid problems by providing an aqueous composition of a water-borne resin comprising a polyester polymer and a solution polymerized acrylic copolymer which aqueous composition has an unexpected combination of desirably low VOC and low viscosity. Other objects of the invention will become apparent to the reader infra.

SUMMARY OF THE INVENTION

The present invention provides an aqueous composition of a water-borne resin which water-borne resin comprises: (I) from 10 to 50 percent by weight of a polyester polymer, and (II) from 90 to 50 percent by weight of a solution polymerized acrylic copolymer. The aqueous composition has an organic solvent content of less than or equal to 15 percent by weight and a viscosity at 25 degrees Celsius (°C.) of less than or equal to 5,000 centipoise when the total solids content of the aqueous composition is greater than or equal to 40 percent by weight. The solution polymerized acrylic copolymer is derived from a mixture of monomers comprising an ethylenically unsaturated carboxylic acid monomer. The water-borne resin is at least partially neutralized by a base and, prior to neutralization, has an acid value based on resin solids of from 10 to 200. With respect to the aforesaid acid value, the term "resin solids" is understood to mean the sum of the solids of components (I) and (II).

An aqueous composition of the invention can be prepared by a certain method which is also a subject of the present invention. The method comprises: (A) addition polymerizing in solution (i.e., solution polymerizing in an organic medium) a first monomer composition containing from 1 percent to 15 percent by weight of an epoxy-functional vinyl monomer and from 99 percent to 85 percent by weight of at least one other copolymerizable vinyl monomer in the presence of a polyester polymer having an acid value on solids of from 10 to 85 milligrams KOH/gram (mg KOH/g) and a weight average molecular weight of from 500 to 2,000 until the epoxy functionality of the epoxy-functional vinyl monomer has been essentially completely reacted, to form a first product (1), and thereafter, (B) addition polymerizing in the aforesaid first product (1), a second monomer composition containing from 3 to 50 percent by weight, based on the total weight of vinyl monomers from parts (A) and (B), of an ethylenically unsaturated carboxylic acid and at least one other copolymerizable vinyl monomer different from the epoxy-functional vinyl monomer, to form a second product (2), and thereafter, (C) dispersing the aforesaid product (2) in water utilizing a basic neutralizing agent. The neutralizing agent can be a base such as ammonia, an organic base or a mixture thereof.

DETAILED DESCRIPTION OF THE INVENTION

An aqueous composition of the invention contains a water-borne resin which water-borne resin comprises: (I) from 10 to 50 percent by weight, preferably from 20 to 40 percent by weight, of a polyester polymer, typically a saturated polyester polymer, and (II) from 90 to 50 percent by weight, preferably from 80 to 60 percent by weight, of a solution polymerized acrylic copolymer derived from a mixture of monomers comprising an ethylenically unsaturated carboxylic acid monomer, preferably acrylic acid, methacrylic acid or a mixture thereof, wherein the water-borne resin is at least partially neutralized by a base and prior to neutralization has an acid value based on resin solids of from 10 to 200, and wherein the aqueous composition has an organic solvent content of less than or equal to 15 percent by weight and a viscosity at 25 degrees Celsius of less than or equal to 5,000 centipoise, preferably less than or equal to 2,000 centipoise, when the total solids content of the aqueous composition is greater than or equal to 40 percent by weight.

Preferably, at least a portion of the acrylic copolymer is grafted to the polyester polymer. A suitable polyester polymer is one which, prior to grafting, has an acid value of from 10 to 85 and a weight average molecular weight of from 500 to 2,000. Molecular weights, as used herein, are determined by gel permeation chromatography (GPC) utilizing a polystyrene standard and tetrahydrofuran as carrier solvent. Typically a saturated polyester polymer is utilized.

Typically, the water-borne resin has a weight average molecular weight of less than 100,000. In the present context, the GPC molecular weight is determined on the water-borne resin comprising the polyester polymer and the solution polymerized acrylic copolymer.

Examples of the polyester polymer include saturated polyester polymers, unsaturated polyester polymers, and alkyd polymers. Saturated polyester polymers are preferred.

Polyester polymers can be prepared by well known techniques by reacting organic polyols, preferably diols, (optionally in combination with monohydric alcohols) with polycarboxylic acids, preferably dicarboxylic acids.

Examples of organic polyols for preparation of the polyester polymer include, but are not limited to, ethylene glycol; propylene glycol; 1,2-butanediol; 1,4- butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; polycaprolactone diol such as the reaction product of epsilon-caprolactone and ethylene glycol; hydroxyalkylated bisphenols; polyether glycols such as poly(oxytetramethylene)glycol; dimethyl hydantoin diols; isocyanuric acid triols; as well as higher molecular weight polyols such as those produced by oxyalkylating lower molecular weight polyols. Examples of the optional monohydric alcohols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

Examples of polycarboxylic acids for preparation of the polyester polymer include: phthalic acid; isophthalic acid; terephthalic acid; trimellitic acid; tetrahydrophthalic acid, hexahydrophthalic acid; tetrachlorophthalic acid; decanoic acid; dodecanoic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be used and are encompassed by the term "polycarboxylic acid". In addition, certain materials which react in a manner similar to acids to form polyester polymers are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid, benzoic acid, stearic acid, hydroxystearic acid and oleic acid often is used in the preparation of the polyester polymer. Also, lower alkyl ester of the acids such as dimethyl glutarate and dimethyl terephthalate can be used.

As set forth above, a water-borne resin for a composition of the invention also comprises a solution polymerized, acrylic copolymer derived from a mixture of monomers containing an ethylenically unsaturated carboxylic acid monomer. While acrylic acid and methacrylic acid are preferred, other suitable ethylenically unsaturated carboxylic acid monomers may be used such as itaconic acid, crotonic acid, maleic acid, and half esters of maleic and fumaric acids, such as butyl hydrogen maleate and ethyl hydrogen fumarate, in which one carboxyl group is esterified with an alcohol. Examples of other ethylenically unsaturated monomers which can be used for making the acrylic copolymer include the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate and isobornyl methacrylate; hydroxyalkyl acrylates and methacrylates such as hydroxyethyl acrylate, hydroxypropyl acrylate, hydroxyethyl methacrylate and hydroxypropyl methacrylate; N-alkoxymethyl acrylamides and methacrylamides such as N-butoxymethyl acrylamide, N-butoxymethyl methacrylamide, N-ethoxymethyl acrylamide and N-ethoxymethyl methacrylamide; epoxy functional ethylenically unsaturated monomers such as glycidyl methacrylate and glycidyl acrylate; and unsaturated nitriles, such as acrylonitrile, methacrylonitrile and ethacrylonitrile. Other ethylenically unsaturated monomers (vinyl monomers) which can be used in addition to the acrylic monomers include: vinyl aromatic hydrocarbons (optionally substituted, for example, by halo atoms) such as styrene, alpha-methyl styrene, alpha-chloromethyl styrene and vinyl toluene; and vinyl aliphatic hydrocarbons (optionally substituted, for example, by halo atoms) such as vinyl acetate and vinyl chloride.

The resin, that is components (I) and (II), for the water-borne resin composition of the invention generally has an acid value on solids, prior to neutralization with the base, of from 10 to 200 mg KOH/g.

The aqueous compositions of the invention typically are prepared according to the method of the invention. In this method the aqueous composition is prepared by: (A) addition solution polymerizing a first monomer composition containing from 1 to 15 percent, preferably from 2 to 5 percent, by weight of an epoxy-functional vinyl monomer and from 99 to 85 percent, preferably from 98 to 95 percent, by weight of at least one other copolymerizable vinyl monomer in the presence of the polyester polymer, preferably a saturated polyester polymer, having an acid value on solids of from 10 to 85 and a weight average molecular weight of from 500 to 2,000 (determined by gel permeation chromatography using a polystyrene standard and tetrahydrofuran as carrier solvent) until the epoxy functionality of the epoxy-functional vinyl monomer has been essentially completely (or completely) reacted, to form a first product (1), and thereafter (B) addition polymerizing in the first product (1) a second monomer composition containing from 3 to 50 percent, preferably from 8 to 25 percent, by weight based on the total weight of vinyl monomers from components (A) and (B) of an ethylenically unsaturated carboxylic acid and at least one other copolymerizable vinyl monomer different from the epoxy-functional vinyl monomer, to form a second product (2), and thereafter (C) dispersing the product (2) in water utilizing a basic neutralizing agent selected from the group consisting of ammonia, an organic base or a mixture thereof. The polyester polymer employed in this method generally has a hydroxyl value on solids of from 100 to 250, preferably of from 100 to 200. The neutralizing agent typically comprises an amine, usually an alkanol amine. After the aforesaid product (2) is obtained, at least part of the residual acid functionality of the product resin is neutralized with a base, and the resulting neutralized product is then dissolved or dispersed in water either by adding water to the neutralized product or by adding the neutralized product to water. Typically, water is added to the neutralized product.

Examples of epoxy-functional vinyl monomers for the aforesaid first monomer composition include: glycidyl acrylate, glycidyl methacrylate, allyl glycidyl ether, methallyl glycidyl ether and glycidyl esters of polymerizable polycarboxylic acids such as maleic acid, fumaric acid, and crotonic acid. Preferred are the epoxy-functional acrylates such as glycidyl acrylate, epoxy-functional methacrylates such as glycidyl methacrylate, or mixtures thereof, glycidyl methacrylate being particularly preferred.

Examples of other vinyl monomers for the first monomer composition include those set forth in the description above with respect to other ethylenically unsaturated monomers which can be used for making the acrylic copolymer, methyl methacrylate being a preferred monomer. Generally however, ethylenically unsaturated carboxylic acid monomers, as well as other ethylenically unsaturated monomers having functional groups substantially reactive with epoxy groups under the polymerization conditions for the first monomer composition, are not included in the first monomer composition for the method of the invention. The presence of such monomers is not preferred because of the tendency of such monomers to compete with acid functionality of the polyester polymer for reaction with epoxy groups of the epoxy-functional vinyl monomers hereby, for example, reducing the amount of grafting of acrylic copolymer to polyester polymer and also tending to increase the amount of epoxy-functional vinyl monomer to assure a desirable amount of grafting.

The method of the invention results in grafting of acrylic copolymer to polyester polymer via reaction of epoxy functionality from the epoxy-functional vinyl monomer with acid functionality on the polyester polymer. Where an unsaturated polyester polymer is used, grafting also can occur via vinyl addition polymerization between unsaturation present in the vinyl monomer components and unsaturation present in the unsaturated polyester polymer.

It is particularly preferred to select vinyl monomers for the first monomer composition to result in the vinyl portion of the aforesaid first product (1) being hydrophobic. The term "hydrophobic" with respect to the first product (1) means that if the first monomer composition were solution polymerized by itself in an organic medium, the resulting polymer would not by itself be soluble or dispersible in water.

Examples of polyester polymers for the method of the invention include the saturated polyester polymers, unsaturated polyester polymers, and alkyd polymers described previously herein, saturated polyester polymers being preferred.

The vinyl polymerization of the first monomer composition generally can be conducted at from 80° C. to 160° C., and typically is conducted at from 130° C. to 150° C.

After the epoxy functionality of the epoxy-functional vinyl monomer of the first monomer composition has been essentially completely (or completely) reacted, in the resulting first product (1) is addition polymerized the aforesaid second monomer composition containing an ethylenically unsaturated carboxylic acid and at least one other copolymerizable vinyl monomer different from the epoxy-functional vinyl monomer, to form the second product (2).

Examples of ethylenically unsaturated carboxylic acid monomers for the aforesaid second monomer composition include those set forth above in the general description of ethylenically unsaturated carboxylic acid monomers for preparation of the acrylic copolymer. Acrylic acid and methacrylic acid are preferred. Examples of other copolymerizable vinyl monomers for the second monomer composition include alkyl acrylates, alkyl methacrylates, hydroxyalkyl acrylates, hydroxyalkyl methacrylates, N-alkoxymethyl acrylamides, N-alkoxymethyl methacrylamides, vinyl aromatic hydrocarbons, vinyl aliphatic hydrocarbons or mixtures thereof, specific examples of which are set forth in the general description above with respect to other ethylenically unsaturated monomers which can be used for making the acrylic copolymer.

The vinyl polymerization of the second monomer composition also can be conducted generally at from 80° C. to 160° C., and typically is conducted at from 130° C. to 150° C.

A vinyl polymerization initiator is employed in the preparation of a resin of the invention. Examples of initiators include: perbenzoates such as tertiary-butyl perbenzoate; azo compounds such as alpha alpha'-azobis(isobutyronitrile); peroxides such as benzoyl peroxide and cumene hydroperoxide; peracetates such as tertiary butyl peracetate; percarbonates such as isopropyl percarbonate, peroxycarbonates such as butyl isopropyl peroxy carbonate, and similar compounds. The quantity of initiator employed can be varied considerably; however, in most instances, it is desirable to utilize from about 0.1 to about 10 percent by weight based on the weight of ethylenically unsaturated monomers used. Where desired, a chain modifying agent or chain transfer agent can be added to the polymerization mixture for control of the molecular weight of the resulting resin. Examples of such agents include the mercaptans, such as tertiary dodecyl mercaptan, dodecyl mercaptan, octyl mercaptan, and hexyl mercaptan, tertiary dodecyl mercaptan being preferred.

The vinyl polymerization reactions for preparing a resin of the invention typically are carried out in the presence of a limited amount of an organic solvent so as to minimize the organic solvent content of the resulting product. In the method of the invention, the polyester polymer serves as a polymerization medium for preparation of the acrylic copolymer thereby significantly reducing the amount of organic solvent needed. Solution polymerization procedures which are known in the vinyl addition polymer art are utilized in the method of the invention with respect to polymerization of the aforesaid first and second monomer compositions. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol, butanol being preferred, and simple glycols such as ethylene glycol and propylene glycol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha. The use of solvents which can contribute to lower reflux temperature, for example butanol, may help to reduce polymerization of vinyl monomers on the interior wall of the reaction vessel above the surface of the reaction mixture. Also, reducing the "head space" (air space above the surface of the reaction mixture) in the reaction vessel may also contribute to the reduction of any vinyl polymerization on the wall of the vessel. Additionally, adding a small amount of air containing oxygen in the nitrogen sparge, which provides the blanket of nitrogen above the reaction mixture, also may contribute to inhibition of such unwanted polymerization on the upper wall of the vessel. Of course, so much oxygen should not be used as would create a hazard of explosion during the vinyl addition polymerization.

Water-borne resin compositions of the invention provide a surprising, advantageous combination of desirable properties which can make them useful in a variety of applications. In particular, the water-borne resin compositions of the invention have an unexpected combination of desirably low VOC and low viscosity. Accordingly, the water-borne resin compositions of the invention can be employed in applications where low VOC and low viscosity are important considerations. In particular, the compositions of the invention can be utilized, for example in various coating compositions, in which it is desired to employ polyester polymers and acrylic polymers in combination for their respective, desirable properties, while at the same time providing low volatile organic solvent content as well as low viscosity for the compositions.

The following examples illustrate the invention and should not be construed as a limitation on the scope thereof. Unless specifically indicated otherwise, all percentages and amounts are understood to be by weight. Wherever used herein "pbw" and "PBW" mean parts by weight.

EXAMPLE 1

This example illustrates the preparation of a water-borne, acrylic/polyester resin composition according to the invention. This acrylic/polyester resin composition is utilized for preparation of the water-borne coating composition of Example 4 which has a surprising combination of low VOC and low viscosity.

A reaction vessel equipped with thermometer, stirrer, dropping funnels, reflux condenser and means for maintaining a blanket of nitrogen is charged at room temperature with a composition consisting of a mixture of 490.8 grams (g) of polyester polyol[1], 50.0 g of butanol, 50.0 g of of propylene glycol, 22.2 g of Carnauba wax[2] and 22.2 g of Shellmax[3]. The composition is heated over a period of about 25 minutes to reflux. When reflux temperature is attained, the simultaneous, gradual addition to the vessel of Charge A and Charge X is begun and continued while maintaining reflux. Charge A consists of a mixture of 18.3 g of glycidyl methacrylate an 592.9 g of methyl methacrylate, and Charge X consists of a mixture of 34.6 g of ethylene glycol monobutyl ether, 27.8 g of t-butyl perbenzoate and 37.6 g of propylene glycol. The addition of Charge A takes a total of 2.5 hours to complete whereas the addition of Charge X takes a total of 5.0 hours to complete. When the addition of charge A is complete, the gradual addition to the vessel of Charge A' is begun and continued while maintaining reflux. Charge A' consists of a mixture of 214.9 g of butyl acrylate, 92.4 g of methyl methacrylate, 92.4 g of acrylic acid, 25.0 g of styrene 40.6 g N-butoxymethyl acrylamide, 25.0 g 2-hydroxyethyl acrylate and 25.0 g of butyl methacrylate. The addition of Charge A' takes a total of 2.5 hours to complete. Thus, the gradual additions of Charge X and Charge A' to the vessel are completed at the same time. Next, 2.4 g of t-butyl perbenzoate in 2.4 g of ethylene glycol monobutyl ether and a rinse consisting of 30.0 g of propylene glycol are added to the vessel. Thereafter, the composition is refluxed for 1.5 hours at the end of which period 2.4 g of t-butyl perbenzoate in 2.4 g of ethylene glycol monobutyl ether is added to the vessel. Thereafter, the composition is refluxed for 1.5 hours at the end of which period heating is discontinued. A sample of the composition diluted in a 1:1 weight ratio with 2-pyrrolidone at this point is determined to have a total solids content (measured for 2 hours at 150° C. of 41.1 percent by weight, a Gardner-Holdt bubble tube viscosity of of V+ and a residual percent by weight content of glycidyl methacrylate, butyl acrylate, styrene, butyl methacrylate, hydroxyethyl acrylate and methyl methacrylate, respectively, of >0.01, >0.01, 0.02, 0.07, (not detectable), and (not detectable). Next, the composition is cooled to a temperature of 100° C. at which temperature the addition of 129.2 g of dimethyl ethanol amine to the vessel is begun and is completed after about 15 minutes. The composition is held at about 100° C. for 15 minutes at the end of which period the gradual addition of 1800.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

[1] A polyester polyol at 90.0 percent by weight theoretical total solids (and 85.0 percent by weight total solids determined for 1 hour at 110 degrees Celsius) in ethylene glycol monobutyl ether. The polyester polyol has a weight average molecular weight of 868 and a number average molecular weight of 517 as determined by gel permeation chromatography using a polystyrene standard; a hydroxyl value of 195.7; an acid value of 39.8; and is prepared by reacting 214.9 pbw of diethylene glycol with 235.1 pbw of phthalic anhydride.
[2] A hydrocarbon wax having a softening point of about 80° C. available from Strahl & Pitsch, Inc.
[3] Shellmax is a petroleum wax having a softening point of about 60°C. available from Shell Oil Co.

The resulting water-borne, acrylic/polyester resin composition is determined to have a total solids content (110° C. for 1 hour) of 42.0 percent by weight, a Brookfield viscosity (No. 4 spindle; 20 rpm) of 930 cps, a pH of 8.3, 0.383 milliequivalents of acid, 0.404 milliequivalents of base, a weight average molecular weight of 13,826 and a number average molecular weight of 1,205 determined by gel permeation chromatography using a polystyrene standard and tetrahydrofuran as carrier solvent.

EXAMPLE 2

This example illustrates the preparation of a comparative water-borne, acrylic resin composition which is utilized for preparation of a comparative water-borne coating composition of Example 4. This comparative acrylic resin is made using the same monomers in approximately the same amounts as in Example 1 except that additional methyl methacrylate is used to replace the glycidyl methacrylate of Example 1, the acrylic acid is not added in a second stage as in Example 1, and no polyester resin is utilized (a conventional solvent level being used instead) resulting in high VOC.

A reaction vessel equipped with thermometer, stirrer, dropping funnels, reflux condenser and means for maintaining a blanket of nitrogen is charged at room temperature with a composition consisting of a mixture of 220.0 g of butanol, 119.4 g of of propylene glycol, 6.9 g of xylene, 377.8 g of ethylene glycol monobutyl ether, 32.2 g of Carnauba wax[1] and 32.2 g of Shellmax[2]. The composition is heated over a period of about 30 minutes to reflux and allowed to reflux for 15 minutes at the end of which period the simultaneous, gradual addition to the vessel of Charge A and Charge X is begun and continued while maintaining reflux. Charge A consists of a mixture of 36.0 g of 2-hydroxyethyl acrylate, 58.5 g of N-butoxymethyl methacrylamide, 36.0 g of styrene, 1013.8 g of methyl methacrylate, 133.1 g of acrylic acid, 309.4 g of butyl acrylate and 36.0 g of butyl methacrylate. Charge X consists of a mixture of 40.0 g of t-butyl perbenzoate, 40.0 g of ethylene glycol monobutyl ether and 20.0 g of propylene glycol. The addition of Charges A and X takes a total of 5.0 hours to complete. When the addition of charges A and X is complete, 2.4 g of t-butyl perbenzoate, 2.4 g of ethylene glycol monobutyl ether and 10.0 g of butanol and a rinse consisting of a mixture of 36.7 g of butanol and 30.0 g of propylene glycol are added to the vessel. Thereafter, the composition is refluxed for 1.5 hours at the end of which period a mixture of 2.4 g of t-butyl perbenzoate, 2.4 g of ethylene glycol monobutyl ether and 10.0 g of butanol is added to the vessel. Thereafter, the composition is refluxed for 1.5 hours at the end of which period heating is discontinued. A sample of the composition at this point diluted in a 1:1 weight ratio with 2-pyrrolidone is determined to have a total solids content (measured for 2 hours at 150° C. of 32.8 percent by weight, a Gardner-Holdt bubble-tube viscosity of of E and a residual percent by weight content of 2-hydroxyethyl acrylate, styrene, methyl methacrylate, butyl acrylate, and butyl methacrylate, respectively, of (not detectable), (not detectable), 0.44, 0.01, 0.05. Next, the composition is cooled to a temperature of 100° C. at which temperature the addition of 164.8 g of dimethyl ethanol amine to the vessel is begun and is completed after about 15 minutes. The composition is held at about 100° C. for 15 minutes at the end of which period the gradual addition of 1972.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

1 Defined in footnote 2 of Example 1.
2 Defined in footnote 3 of Example 1.

The resulting product is a comparative water-borne, acrylic resin composition. It is determined to have a total solids content (110° C. for 1 hour) of 37.3 percent by weight, a Brookfield viscosity (No. 4 spindle; 20 rpm) of 2,030 cps, a pH of 7.95, 0.396 milliequivalents of acid, 0.394 milliequivalents of base and a weight average molecular weight of 11,336 determined by gel permeation chromatography using a polystyrene standard and tetrahydrofuran as carrier solvent.

EXAMPLE 3

This example illustrates the preparation of a comparative water-borne, acrylic/polyester resin composition which is utilized for preparation of a comparative water-borne coating composition of Example 4. This comparative acrylic resin is made using the same monomers in the same amounts as in Example 2 and is made in the same manner except that a polyester resin is used in the preparation in place of some of the conventional solvent.

A reaction vessel equipped with thermometer, stirrer, dropping funnels, reflux condenser and means for maintaining a blanket of nitrogen is charged at room temperature with a composition consisting of a mixture of 490.8 g of polyester polyol[1], 50.0 g of butanol, 50.0 g of of propylene glycol, 22.2 g of Carnauba wax[2] and 22.2 g of Shellmax[3]. The composition is heated over a period of about 35 minutes to reflux and allowed to reflux for 10 minutes at the end of which period the simultaneous, gradual addition to the vessel of Charge A and Charge X is begun and continued while maintaining reflux. Charge A consists of a mixture of 214.9 g of butyl acrylate, 703.6 g of methyl methacrylate, 92.4 g of acrylic acid, 25.0 g of styrene, 40.6 g N-butoxymethyl acrylamide, 25.0 g 2-hydroxyethyl acrylate and 25.0 g of butyl methacrylate, and Charge X consists of a mixture of 34.6 g of ethylene glycol monobutyl ether, 27.8 g of t-butyl perbenzoate and 37.6 g of propylene glycol. The addition of Charges A and X takes a total of 5.0 hours to complete. When the addition of charges A and X is complete, 2.4 g of t-butyl perbenzoate in 2.4 g of ethylene glycol monobutyl ether and a rinse consisting of a mixture of 30.0 g of propylene glycol are added to the vessel. Thereafter, the composition is refluxed for 1.5 hours at the end of which period 2.4 g of t-butyl perbenzoate in 2.4 g of ethylene glycol monobutyl ether is added to the vessel. Thereafter, the composition is refluxed for 1.5 hours at the end of which period heating is discontinued. A sample of the composition at this point diluted in a 1:1 weight ratio with 2-pyrrolidone is determined to have a total solids content (measured for 2 hours at 150° C. of 40.1 percent by weight, a Gardner-Holdt bubble-tube viscosity of of M and a residual percent by weight content of methyl methacrylate, styrene, butyl acrylate, 2-hydroxyethyl acrylate, and butyl methacrylate, respectively, of 0.84, 0.02, 0.01, (not detectable) and 0.11. Next, the composition is cooled to a temperature of 100° C. at which temperature the addition of 129.2 g of dimethyl ethanol amine to the vessel is begun and is completed after about 15 minutes. The composition is held at about 100° C. for 15 minutes at the end of which period the gradual addition of 1800.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

1 Defined in footnote 1 of Example 1.
2 Defined in footnote 2 of Example 1.
3 Defined in footnote 3 of Example 1.

The resulting product is a comparative water-borne, acrylic/polyester resin composition. It is determined to have a total solids content (110° C. for 1 hour) of 37.3 percent by weight, a Brookfield viscosity (No. 4 spindle; 20 rpm) of 18,380 cps, a pH of 7.85, 0.385 milliequivalents of acid, 0.360 milliequivalents of base and a weight average molecular weight of 8,176 determined by gel permeation chromatography using a polystyrene standard and tetrahydrofuran as carrier solvent.

EXAMPLE 4

Part (a) of this example illustrates the viscosities and VOC's (volatile organic contents) for water-borne coating compositions prepared from the product resin compositions of Examples 1 through 3 above. Part (b) illustrates the application and curing of coatings made from the respective compositions as well as film properties for the cured coatings.

(a) Three coating compositions, identified herein as C-1, C-2 and C-3, are prepared by mixing the following ingredients in the amounts set forth in the following Table 1. Coating composition, C-3, is prepared utilizing the product acrylic/polyester resin composition of the invention.

TABLE 1

| Coating Composition | Mass (grams) | | |
|---|---|---|---|
| | C-1 | C-2 | C-3 |
| Polyester Polyol[1] | 24.96 | 0 | 0 |
| Dimethylethanol amine | 1.35 | 0 | 0 |
| Deionized water | 46.10 | 17.80 | 39.50 |
| Product Resin of Example 1 | 0 | 0 | 190.50 |
| Product Resin of Example 3 | 0 | 212.20 | 0 |
| Product Resin of Example 2 | 157.59 | 0 | 0 |
| Hexakismethoxymethyl melamine[2] | 20.00 | 20.00 | 20.00 |
| Total mass | 250.00 | 250.00 | 250.00 |

[1]The polester resin as defined in footnote 1 to Example 1.
[2]A crosslinking agent available as CYMEL 303 from American Cyanamid Company.

The total level of polyester resin solids, the total level of acrylic resin solids and the total level of crosslinking agent solids is believed to be the same for each of coating compositions C-1, C-2 and C-3.

The percent by weight solids content (calculated), the volatile organic solvent content (VOC; calculated), Brookfield viscosity (measured) and the weight per gallon (measured) for each of the above coating compositions, is as set forth in the following Table 2.

TABLE 2

| Coating Composition | C-1 | C-2 | C-3 |
|---|---|---|---|
| Percent by Weight Solids | 40.0 | 40.0 | 40.0 |
| Weight/Gallon (lbs/gal) | 8.94 | 8.97 | 9.03 |
| Volatile organic solvent content | 2.49 | 1.77 | 1.72 |
| Brookfield viscosity (Centipoise) | 649[1] | 7215[2] | 101[3] |

[1]Determined using a Brookfield LVT viscometer with a No. 52 cone. The viscosity is determined to be essentially Newtonian at shear rates of 0.6 to 24 reciprocal seconds.
[2]Determined using a Brookfield HBT viscometer with a No. 52 cone. The viscosity is determined to be essentially Newtonian at shear rates of 5 to 200 reciprocal seconds.
[3]Determined using a Brookfield LVT viscometer with a No. 52 cone. The viscosity is determined to be essentially Newtonian at shear rates of 3 to 120 reciprocal seconds.

As can be seen from Table 2, the water-borne coating composition, C-3, prepared from the acrylic/polyester resin composition prepared according to the invention not only had a very low organic solvent content, but surprisingly had a very low viscosity as well even though the weight average molecular weight of the acrylic/polyester resin composition of Example 1 is higher than the weight average molecular weights of the resin compositions of the comparative examples.

(b) A sample of each of the coating compositions C-1, C-2 and C-3 is drawn on a 22 gauge steel panel treated with BONDERITE 1000 and is cured for 15 minutes at 325° F. (163° C.) to provide a film having a dry film thickness of 0.6 to 0.7 mils. The visual appearance, solvent resistance and pencil hardness are measured for each of the cured films, designated respectively herein as C-1', C-2' and C-3', and are as set forth in the following Table 3. The solvent resistance is determined by measuring the number of back-and-forth finger rubs with a cloth dipped in methylethyl ketone ("MEK Double Rubs") that it takes to remove the film down to the substrate.

TABLE 3

| Cured Film | Appearance | MEK Double Rubs | Pencil Hardness |
|---|---|---|---|
| C-1' | Good | 31 | F |
| C-2' | Slight Orange Peel | 34 | F |
| C-3' | Good | 31 | F |

EXAMPLE 5

This example illustrates the preparation of a water-borne, acrylic/polyester resin composition according to the invention.

A reaction vessel equipped with thermometer, stirrer, dropping funnels, reflux condenser and means for maintaining a blanket of nitrogen is charged at room temperature with a composition consisting of a mixture of 490.8 grams (g) of polyester polyol[1], 100.0 g of butanol, 22.2 g of Carnauba wax[2] and 22.2 g of Shellmax[3]. The composition is heated under a blanket of nitrogen over a period of about 35 minutes to reflux at which point the supply of nitrogen to the sparge line is turned off and the composition is allowed to reflux for 40 minutes. Next, the simultaneous, gradual addition to the vessel of Charge A and Charge X is begun and continued while maintaining reflux. Charge A consists of a mixture of 18.3 g of glycidyl methacrylate, 592.9 g of methyl methacrylate and 5.6 g of tertiary-dodecyl mercaptan, and Charge X consists of a mixture of 34.6 g of ethylene glycol monobutyl ether, 27.8 g of t-butyl perbenzoate and 37.6 g of propylene glycol. The addition of Charge A takes a total of 2.5 hours to complete whereas the addition of Charge X takes a total of 5.0 hours to complete. When the addition of charge A is complete, the gradual addition to the vessel of Charge A' is begun and continued while maintaining reflux. Charge A' consists of a mixture of 214.9 g of butyl acrylate, 92.4 g of methyl methacrylate, 92.4 g of acrylic acid, 25.0 g of styrene 40.6 g N-butoxymethyl acrylamide, 25.0 g 2-hydroxyethyl acrylate and 25.0 g of butyl methacrylate. The addition of Charge A' takes a total of 2.5 hours to complete. Thus, the gradual additions of Charge X and Charge A' to the vessel are completed at the same time. Next, 2.4 g of t-butyl perbenzoate in 2.4 g of ethylene glycol monobutyl ether and a rinse consisting of 30.0 g of propylene glycol are added to the vessel. Thereafter, the composition is refluxed for 1.5 hours at the end of which period 2.4 g of t-butyl perbenzoate in 2.4 g of ethylene glycol monobutyl ether is added to the vessel. Thereafter, the composition is refluxed for 1.5 hours at the end of which period heating is discontinued. Next, the composition is cooled to a temperature of 110° C. at which temperature the addition of 129.2 g of dimethyl ethanol amine to the vessel is begun and is completed after about 15 minutes. The composition is held at between about 110° C. and 100° C. for 15 minutes at the end of which period the gradual addition of 1800.0 g of preheated (about 72° C.) deionized water to the vessel is begun and is completed at the end of 1.5 hours. Thereafter, the composition is maintained at about 72°–74° C. for 2 hours after which heating is discontinued and the composition is allowed to cool to room temperature.

1 Defined in footnote 1 of Example 1.
2 Defined in footnote 2 of Example 1.
3 Defined in footnote 3 of Example 1.

The resulting water-borne, acrylic/polyester resin composition is determined to have a total solids content (110° C. for 1 hour) of 41.9 percent by weight, a Brookfield viscosity (No. 4 spindle; 20 rpm) of 720 cps, a pH of 8.15, 0.379 milliequivalents of acid, 0.399 milliequivalents of base, a weight average molecular weight of 13,278 and a number average molecular weight of 1,205 determined by gel permeation chromatography using a polystyrene standard and tetrahydrofuran as carrier solvent, and residual contents of methyl methacrylate, styrene, butyl acrylate, hydroxyethyl acrylate, butyl methacrylate and glycidyl methacrylate, respectively of 0.12, 0.02, 0.02, (not detectable), 0.04 and (not detectable).

What is claimed is:

1. An aqueous composition of a water-borne resin which water-borne resin comprises:
   (I) from 10 to 50 percent by weight of a polyester polymer, and
   (II) from 90 t 50 percent by weight of a solution polymerized acrylic copolymer derived from a mixture of monomers comprising an ethylenically unsaturated carboxylic acid monomer.

wherein said water-borne resin is at least partially neutralized by a base and prior to neutralization has an acid value based on resin solids of from 10 to 200, said aqueous composition has an organic solvent content of less than or equal to 15 percent by weight and a viscosity at 25 degrees Celsius of less than or equal to 5,000 centipose when the total solids content of said aqueous composition is greater than or equal to 40 percent by weight, and wherein said aqueous composition is prepared by:

(A) addition polymerizing in solution in the presence of a free-radical polymerization initiator, a first monomer composition essentially free of ethylenically unsaturated monomers having functional groups substantially reactive with epoxy groups, said first monomer composition containing from 1 to 15 percent by weight of an epoxy-functional vinyl monomer and from 99 to 85 percent by weight of at least one other copolymerizable vinyl monomer in the presence of said polyester polymer having an acid value on solids of from 10 to 85 and a weight average molecular weight of from 500 to 2,000 until the epoxy functionality of said epoxy-functional vinyl monomer has been essentially completely reacted, to form a first product (1) wherein the vinyl portion of said product (1) is hydrophobic, and thereafter (B) addition polymerizing in solution in said first product (1) in the presence of a free-radical polymerization initiator, a second monomer composition containing from 3 to 50 percent by weight, based on the total weight of vinyl monomers from components (A) and (B), of an ethylenically unsaturated carboxylic acid and at least one other copolymerizable vinyl monomer different from said epoxy-functional vinyl monomer, to form a second product (2), wherein the addition polymerizations of steps (A) and (B) above are conducted in the presence of at most a limited amount of an organic solvent, and thereafter (C) dispersing said product (2) in water utilizing a neutralizing agent selected from the group consisting of ammonia, an organic base or a mixture thereof.

2. The aqueous composition of claim 1 wherein said polyester polymer is a saturated polyester polymer.

3. The aqueous composition of claim 2 wherein said first monomer composition comprises methyl methacrylate.

4. The aqueous composition of claim 1 wherein said epoxy-functional vinyl monomer comprises an epoxy-functional acrylate, an epoxy-functional methacrylate or a mixture thereof.

5. The aqueous composition of claim 1 wherein said second monomer composition contains from 8 to 25 percent by weight of said ethylenically unsaturated carboxylic acid based on the total weight of vinyl monomers from components (A) and (B).

6. The aqueous composition of claim 1 wherein said other copolymerizable vinyl monomer of component (B) comprises an alkylacrylate, an alkylmethacrylate, a hydroxyalkyl acrylate, a hydroxyalkyl methacrylate, an N-alkoxymethyl methacrylamide, an N-alkoxymethyl acrylamide, a vinyl aromatic hydrocarbon, a vinyl aliphatic hydrocarbon or a mixture thereof.

7. The aqueous composition of claim 1 wherein said polyester polymer has a hydroxyl value on solids of from 10 to 250 and said neutralizing agent comprises an amine.

8. The aqueous composition of claim 5 wherein said epoxy-functional vinyl monomer comprises glycidyl acrylate, glycidyl methacrylate or a mixture thereof; said polyester polymer is a saturated polyester having a hydroxyl value on solids of from 100 to 200; said ethylenically unsaturated carboxylic acid comprises acrylic acid, methacrylic acid or a mixture thereof; said other copolymerizable vinyl monomer of component (B) comprises an alkyl acrylate, an alkyl methacrylate, a hydroxyalkyl acrylate, a hydroxyalkyl methacrylate, an N-alkoxymethyl methacrylamide, an N-alkoxymethyl acrylamide, a vinyl aromatic hydrocarbon, a vinyl aliphatic hydrocarbon or a mixture thereof; and said neutralizing agent comprises an amine.

* * * * *